United States Patent
Suzuki et al.

(10) Patent No.: US 10,635,384 B2
(45) Date of Patent: Apr. 28, 2020

(54) ELECTRONIC DEVICE, MUSICAL SOUND CONTROL METHOD, AND STORAGE MEDIUM

(71) Applicant: CASIO COMPUTER CO., LTD., Tokyo (JP)

(72) Inventors: Taiju Suzuki, Tokyo (JP); Shinichi Moritani, Kanagawa (JP); Yusuke Hatano, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 532 days.

(21) Appl. No.: 15/268,913

(22) Filed: Sep. 19, 2016

(65) Prior Publication Data
US 2017/0090862 A1   Mar. 30, 2017

(30) Foreign Application Priority Data

Sep. 24, 2015  (JP) .................................. 2015-187402
Sep. 24, 2015  (JP) .................................. 2015-187403

(51) Int. Cl.
*G06F 3/0484*  (2013.01)
*G06F 3/16*  (2006.01)
(Continued)

(52) U.S. Cl.
CPC ............ *G06F 3/165* (2013.01); *G06F 3/0486* (2013.01); *G06F 3/04847* (2013.01); *G10H 1/00* (2013.01)

(58) Field of Classification Search
CPC .... G06F 3/165; G06F 3/04847; G06F 3/0486; G10H 1/00
See application file for complete search history.

(56) References Cited

U.S. PATENT DOCUMENTS 5,212,733 A * 5/1993 DeVitt ................. G10H 1/0008
                                                         381/119
5,646,362 A * 7/1997 Koyama .............. G10H 1/0008
                                                         704/278

(Continued)

FOREIGN PATENT DOCUMENTS

JP   H6-175661    6/1994
JP   H10-91166    4/1998

(Continued)

OTHER PUBLICATIONS

Notification of Reasons for Refusal dated Jun. 18, 2019 received in Japanese Patent Application No. JP 2015-187403 together with an English language translation.

*Primary Examiner* — Dino Kujundzic
(74) *Attorney, Agent, or Firm* — Scully Scott Murphy & Presser

(57) ABSTRACT

An electronic device having a display section, comprising: a processor, wherein the processor executes the processing of: displaying a module image corresponding to a module used for sound processing and a sound information image corresponding to sound information relating to generation of a sound which can be set in the module on the display section; receiving an operation on at least one of the sound information image displayed on the display section and the module image displayed on the display section; and controlling the sound processing performed by setting the sound information corresponding to the sound information image to the module according to the operation.

12 Claims, 10 Drawing Sheets

(51) Int. Cl.
    *G06F 3/0486*     (2013.01)
    *G10H 1/00*     (2006.01)

(56) References Cited

U.S. PATENT DOCUMENTS

| | | | | |
|---|---|---|---|---|
| 6,140,565 | A * | 10/2000 | Yamauchi | G10H 1/0008 84/477 R |
| 6,490,359 | B1 * | 12/2002 | Gibson | G10H 1/0008 381/119 |
| 7,050,869 | B1 * | 5/2006 | Katayama | G11B 27/028 381/119 |
| 7,774,707 | B2 * | 8/2010 | Sim | G10H 1/0066 715/727 |
| 2005/0220309 | A1 * | 10/2005 | Hirata | H04S 7/302 381/18 |
| 2009/0308231 | A1 * | 12/2009 | Mizuhiki et al. | G10H 1/0008 84/622 |
| 2011/0209597 | A1 * | 9/2011 | Usui | G10H 1/0008 84/622 |
| 2014/0254826 | A1 * | 9/2014 | Allen | H03G 5/02 381/98 |
| 2015/0309703 | A1 * | 10/2015 | Robertson | G10H 1/0025 715/716 |

FOREIGN PATENT DOCUMENTS

| | | |
|---|---|---|
| JP | 2000-221971 A | 8/2000 |
| JP | 2008-83525 A | 4/2008 |
| JP | 2010-066655 A | 3/2010 |

* cited by examiner

ELECTRONIC DEVICE, MUSICAL SOUND CONTROL METHOD, AND STORAGE MEDIUM

CROSS-REFERENCE TO RELATED APPLICATIONS

This application is based on and claims the benefit of priority from Japanese Patent Application Nos. 2015-187402 and 2015-187403, respectively filed on 24 Sep. 2015, the contents of which are incorporated herein by reference.

BACKGROUND OF THE INVENTION

Field of the Invention

The present invention relates to an electronic device, a musical sound control method, and a storage medium.

Related Art

Conventionally, an analog synthesizer for creating electronic musical sound is mainly configured by the three modules of an "oscillator", "filter", and "amplifier". Herein, the oscillator can change a waveform and a sound pitch, the filter can adjust tonal brightness, and the amplifier can adjust the magnitude of a sound. By adapting a module called an envelope to each of the modules of the "oscillator", "filter", and "amplifier", it is possible to impart temporal change to the pitch and the magnitude of musical sound generated at each of the modules of the "oscillator", "filter", and "amplifier".

A technology relating to such an analog synthesizer is described in Japanese Unexamined Patent Application, Publication No. 2008-083525, for example.

SUMMARY OF THE INVENTION

However, a conventional analog synthesizer has realized the functions thereof by wiring such as circuit elements. On the other hand, since the transition to digital synthesizers in recent years, the state of an envelope is often controlled by a list of parameters, etc., transmitted and received between modules, and thus it is not easy to assess the relationships between the modules or to perform operations for sound production. In other words, conventional digital synthesizers do not possess high usability.

The present invention is made in view of such a situation, and it is an object of the present application to enhance usability when creating musical sound with a digital synthesizer.

In order to achieve the abovementioned object, an electronic device according to one aspect of the present invention is the electronic device having a display section, comprising:

a processor, wherein the processor executes the processing of:

displaying a module image corresponding to a module used for sound processing and a sound information image corresponding to sound information relating to generation of a sound which can be set in the module on the display section;

receiving an operation on at least one of the sound information image and the module image displayed on the display section; and controlling the sound processing performed by setting the sound information corresponding to the sound information image to the module according to the operation.

DETAILED DESCRIPTION OF THE INVENTION

In the following, embodiments of the present invention are described with reference to the drawings.

Figure 1:
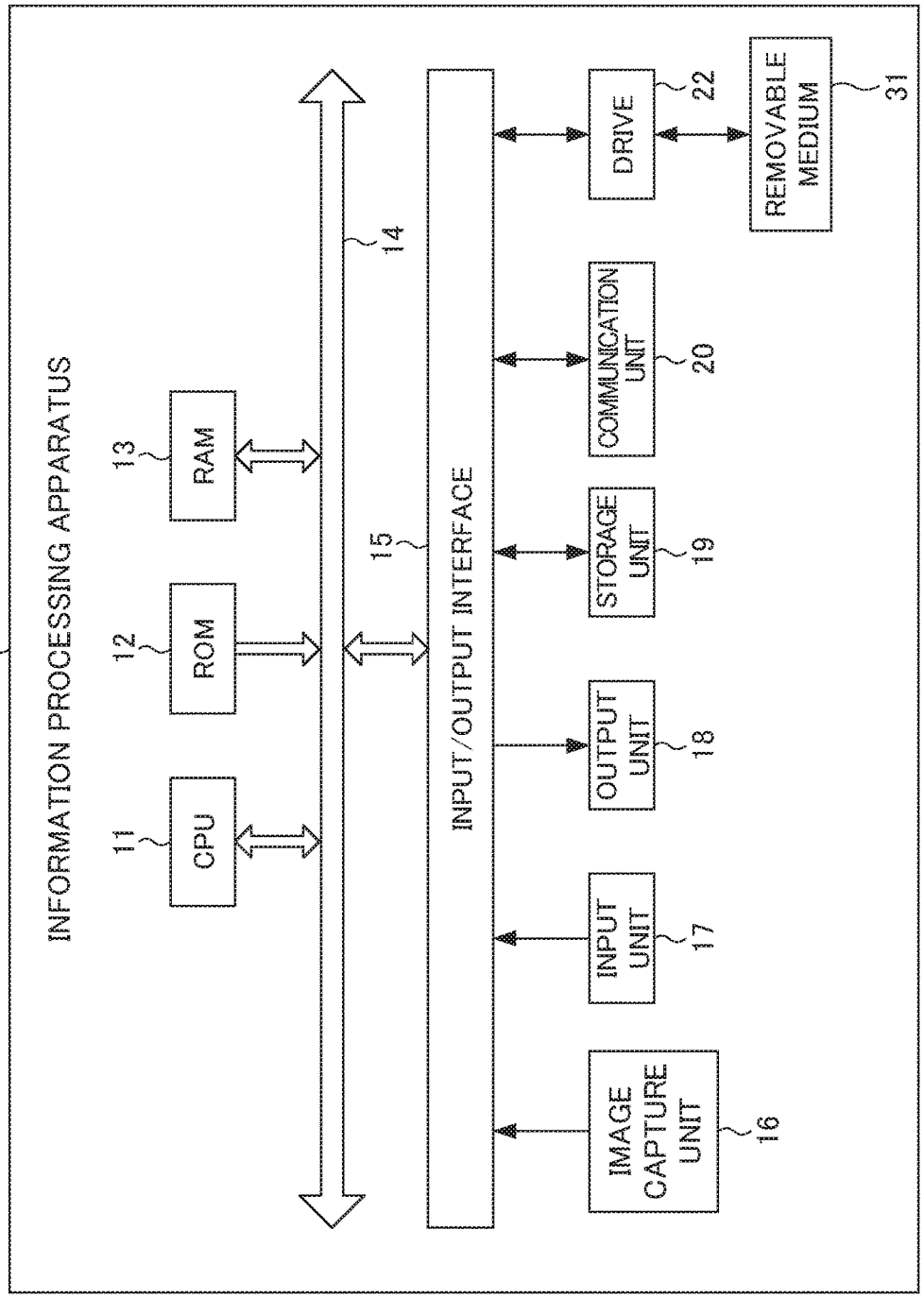
FIG. 1 is a block diagram illustrating a hardware configuration of an information processing apparatus according to one aspect of the present invention.

FIG. 1 is a block diagram illustrating a hardware configuration of an information processing apparatus 1 according to one aspect of the present invention. The information processing apparatus 1 is configured as a smartphone, for example.

The information processing device 1 includes a CPU (Central Processing Unit) 11 as a processor, ROM (Read Only Memory) 12, RAM (Random Access Memory) 13, a bus 14, an input/output interface 15, an image capture unit 16, an input unit 17, an output unit 18, a storing unit 19, a communication unit 20, and a drive 21.

The CPU 11 executes various processing in accordance with a program recorded in the ROM 12, or a program loaded from the storage unit 20 into the RAM 13.

Data, etc. required upon the CPU 11 executing the various processing is stored in the RAM 13 as appropriate.

The CPU 11, ROM 12 and RAM 13 are connected to each other via the bus 14. In addition, the input/output interface 15 is also connected to this bus 14. The image capture unit 16, input unit 17, output unit 18, storage unit 19, communication unit 20 and drive 21 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor.

The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of an object in the optoelectronic conversion device. The optoelectronic conversion device optoelectronically converts (i.e. captures) the image of the object, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, and the like as appropriate.

The input unit 17 is configured with a touch sensor of capacitive-type or resistance-film-type, etc., and detects a contact position of a contacting object such as a user's finger, etc. In the present embodiment, a touch sensor of the input unit 17 is arranged so as to be superimposed on a display (a display unit) of the output unit 18, and a display position on the display and a contact position on the touch sensor are associated with each other. In other words, a touch screen is configured by the display and the touch sensor.

The output unit 18 is configured with a display, a speaker, etc., and displays various pieces of information such as a setting screen, and outputs sound.

The storing unit 19 is configured by a hard disk, DRAM (Dynamic Random Access Memory) or the like, and stores data of various images.

The communication unit 20 controls communication with other devices (not illustrated) via networks including the Internet.

Removable medium 31 made from a magnetic disk, optical disk, magneto-optical disk, semiconductor memory or the like is installed as appropriate in the drive 21. A program read from the removable media 31 by the drive 21 is installed in the storage unit 19 as necessary. In addition, similarly to the storage unit 19, the removable medium 31 can store various data such as the data of images stored in the storage unit 19.

Figure 2:
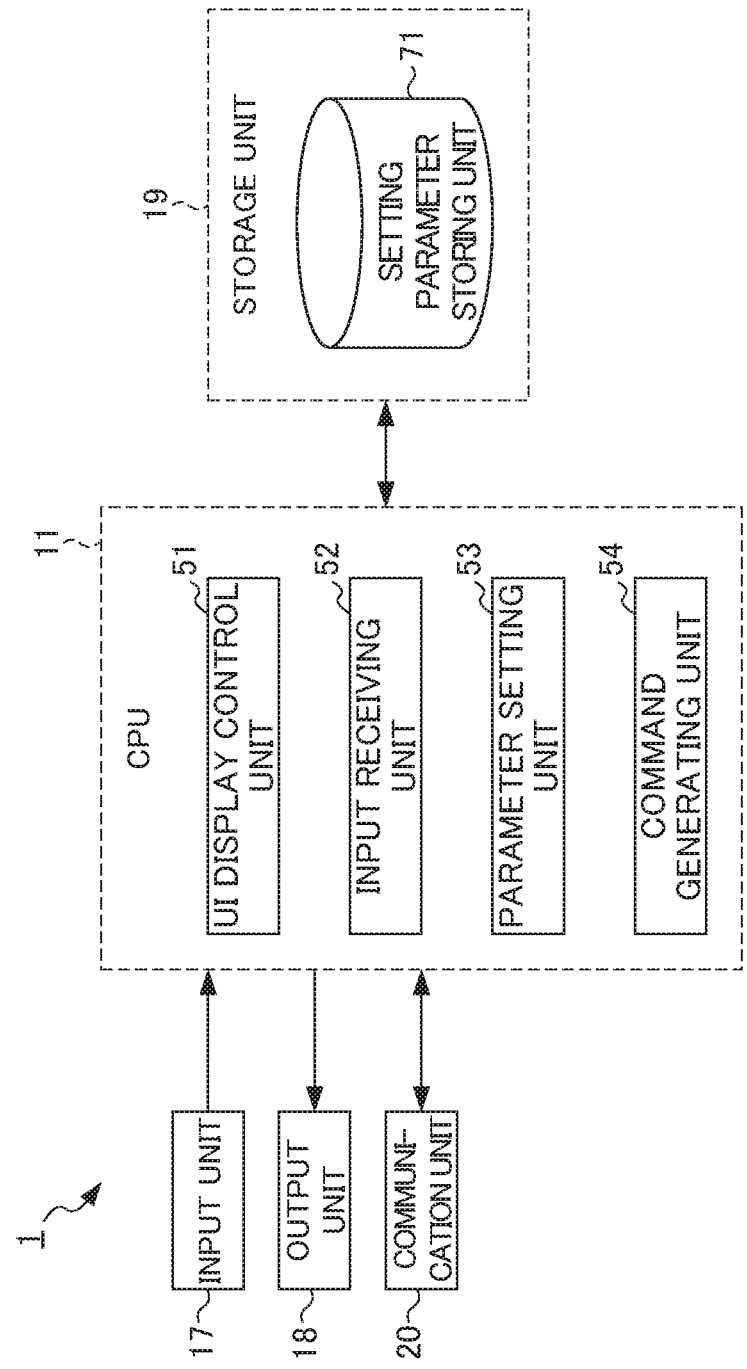
FIG. 2 is a functional block diagram illustrating a functional configuration for executing musical sound control processing, among the functional configurations of the information processing apparatus of FIG. 1.

FIG. 2 is a functional block diagram illustrating a functional configuration for executing musical sound control processing, among the functional configurations of such an information processing apparatus 1.

Musical sound control processing refers to a sequence of processing of enabling to set parameters constituting an envelope for imparting a change to a module of a digital synthesizer by receiving a visual operation input on a figure representing the envelope, as well as applying an icon representing an envelope or setting contents of a module to the module by receiving a visual operation input.

In a case in which the musical sound control processing is executed, as illustrated in FIG. 2, a UI (User Interface) display control unit 51, an input receiving unit 52, a parameter setting unit 53, and a command generating unit 54 function in the CPU 11.

In addition, a setting parameter storing unit 71 is established in a region of the storage unit 19.

Data of contents set as the modules of an oscillator, a filter, and an amplifier (a waveform of a musical sound generated, type or gain of a filter, etc.) and values of various parameters constituting an envelope applied to these modules are stored in the setting parameter storing unit 71.

In a case in which the musical sound control processing is executed, the UI display control unit 51 displays a screen of a user interface for parameter setting of an envelope to be performed by a user, and for displaying the setting contents of a current module to the user. In addition, when parameter setting of an envelope is performed by the user, and a setting of a module or application intensity (influence intensity) of an envelope is changed, the UI display control unit 51 successively displays the change of the setting contents.

More specifically, the UI display control unit 51 displays an icon representing various modules which becomes a target for parameter setting in the musical sound control processing, and displays a tool bar in which icons are stored which represent envelopes that can be applied to the modules and setting contents of the modules. In addition, in a case in which an operation of selecting any button in the tool bar was performed, the UI display control unit 51 displays the envelopes that can be applied to the modules and a group of icons of the setting contents. It should be noted that the buttons in the tool bar include a button which corresponds to any module and a button which corresponds to a plurality of modules.

Then, the UI display control unit 51 displays icons for parameter setting of an envelope corresponding to the icon on which an operation to select a target for setting a parameter (for example, double-tap) was performed. The icon for parameter setting is represented as a waveform which is formed with a link and a node corresponding to a horizontal axis as time and a vertical axis as intensity (magnitude), and has a shape of the envelope corresponding to each parameter including an attack point, a decay point, a sustain bar, and a release point. When an operation input to the icon for this parameter setting is performed which changes the shape via the input receiving unit 52, the UI display control unit 51 successively changes the shape of the envelope at the icon for the parameter setting.

In addition, when an icon of any envelope is selected from among a group of displayed icons, and then the icon is dragged so as to be close to the icon representing a module, the UI display control unit 51 changes a display form of the icon representing the envelope according to the degree in which the envelope is applied to the module.

For example, when the icon representing the envelope is dragged so as to be close to the icon representing the module, the UI display control unit 51 displays an image of an object with a form which is set in advance (for example, a plurality of circular objects of different sizes and colors) along a trajectory of the icon representing the envelope according to the degree to which the envelope is applied to the module.

In addition, when any icon representing setting contents of the module is selected from among a group of displayed icons, and then the icon is dragged so as to be close to the icon representing the module, the UI display control unit 51 changes a display form of an icon representing a module according to the degree in which the envelope is applied to the module.

For example, when an icon representing setting contents (filter type) is made to be closed to the icon representing the module of the filter, in a case in which the setting contents of the icon represent a low pass filter, the UI display control unit 51 notifies that the low pass filter is applied by way of displaying that the upper portion is shielded in the icon representing the module of the filter. In other words, it is notified that a high frequency component is cut off by associating a vertical direction of the icon representing the module with the level of a frequency, and shielding the upper portion. Similarly, when an icon representing a high pass filter is made to be close to the icon representing the module, display is performed which shields a lower portion of the icon representing the module. In addition, when an icon representing a band pass filter is made to be close to the icon representing the module, display that shields the upper portion and the lower portion of the icon representing the module is performed.

When a touch operation by a user (tap, double-tap, or drag, etc.) is performed on the screen of the user interface, the input receiving unit 52 detects the contents of the touch operation and outputs an instruction signal indicating the contents of the touch operation thus detected to each of the functional units.

When the operation input that changes the shape to the icon for parameter setting of an envelope, the parameter setting unit 53 sets a parameter corresponding to the shape after the change displayed by the UI display control unit 51 in the envelope.

More specifically, in the icon for parameter setting, when the position, etc. of the node or the link corresponding to a parameter of the attack point, the decay point, the sustain bar, or the release point is changed, the parameter setting unit 53 specifies the parameter that was changed in the icon for parameter setting, and calculates the change amount of the parameter corresponding to the change and changes the value of the parameter that is set to the envelope. Then, for the envelope, the parameter setting unit 53 stores the value of the parameter thus changed in the setting parameter storage unit 71.

When an operation input is performed which applies the envelope or the setting contents of the module to the module via the input receiving unit 52, the command generating unit 54 generates a command to generate a musical sound created as a result of applying to the module a parameter of the envelope or a parameter of the setting contents of the module. This command is, for example, generated as a command based on MIDI (Musical Instrument Digital Interface) and is outputted to a MIDI sound source (not illustrated) via the communication unit 20, etc.

With such a functional configuration, the following user interface is realized in the information processing apparatus 1.

Basic Configuration of User Interface

Figure 3:
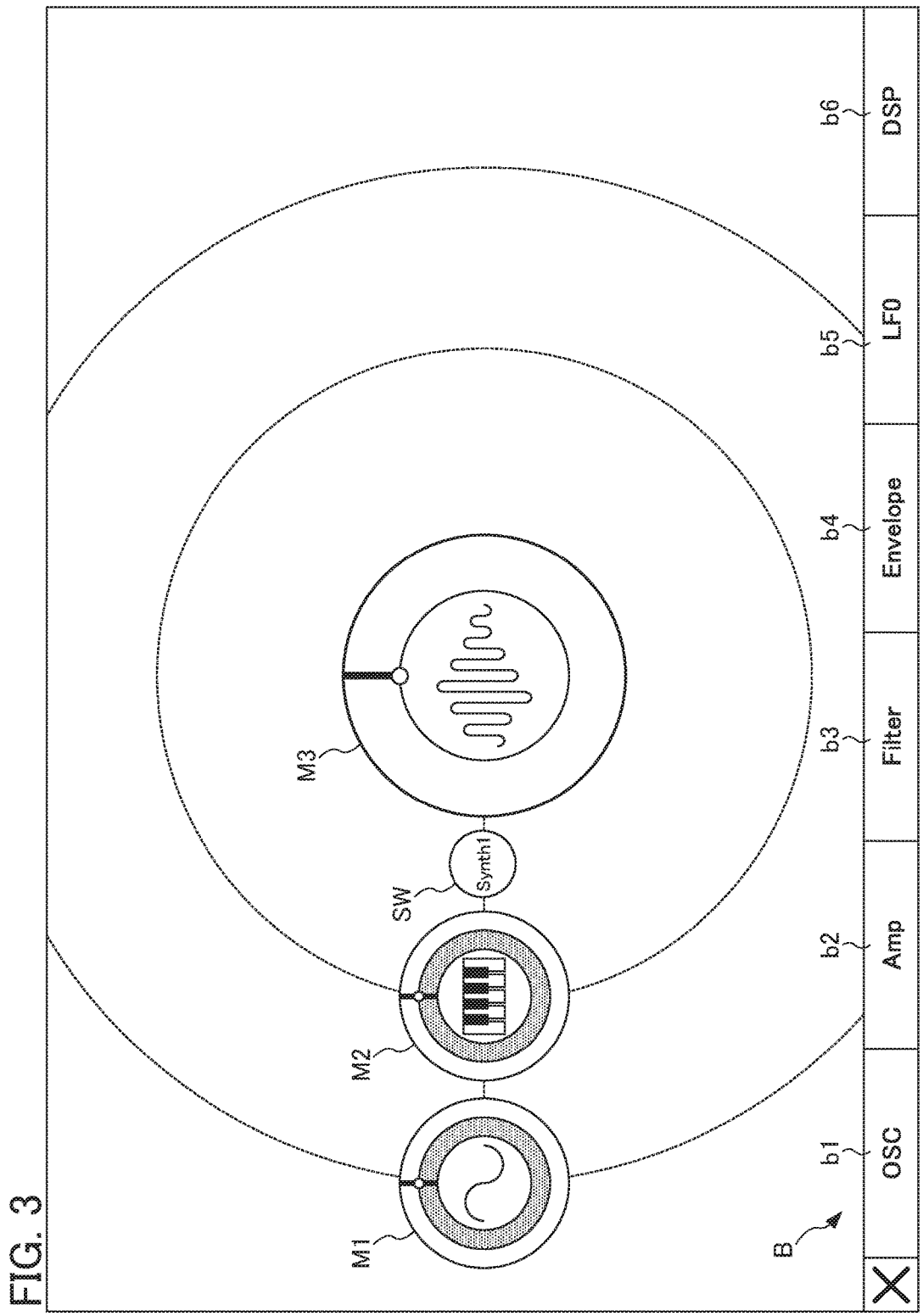
FIG. 3 is a schematic view illustrating a screen configuration example of a user interface displayed in the musical sound control processing.

FIG. 3 is a schematic view illustrating a screen configuration example of a user interface displayed in the musical sound control processing.

As illustrated in FIG. 3, in the UI screen of the musical sound control processing, an operation screen is configured which includes an oscillator module M1, an amplifier module M2, a filter module M3, a tool bar B, and a switch SW. Among these, the oscillator module M1, the amplifier module M2, the filter module M3, and the switch SW are configured by circular icons, and the tool bar B is configured by a belt-like region in which a plurality of buttons (b1, b2, b3, b4, b5, and b6) are arranged at a bottom part of the screen. The oscillator module M1, the amplifier module M2, and the filter module M3 correspond to actual modules (an oscillator, an amplifier, a filter) that are used for sound generation. Therefore, the contents set to the oscillator module M1, the amplifier module M2, and the filter module M3 on the UI screen of the musical sound control processing can be reflected in musical sounds that are generated at the actual respective modules.

The oscillator module M1 is a module that corresponds to a waveform type and a pitch of a musical sound to be generated, and the waveform type that is set (sine wave, triangular wave, rectangular wave, etc.) is displayed in a central circular region. Although a sine wave is set in FIG. 3, it is possible to select an icon in which another waveform such as a triangular wave is displayed in the tool bar B (described later). In this case, an icon which displays the waveform to be selected is selected in the tool bar B, and the selected icon is arranged so as to be superimposed at the center of the oscillator module M1 (the circular portion in which the sine wave is displayed in FIG. 3). With such a configuration, the waveform displayed in the icon selected in the tool bar B is reflected in the oscillator. In addition, a slider for changing the pitch is displayed between a top portion of the central circular region at the oscillator module M1 and a top portion of a circular portion surrounding the perimeter.

The amplifier module M2 is a module that corresponds to the magnitude of a musical sound to be generated, and an image representing the change of the magnitude of a sound (herein, an image of an organ keyboard) is displayed in a central circular region. In other words, a sequence of a change of the magnitude of sound corresponding to the user's sound generating operation (for example, in the case of keyboard instrument, the change of the magnitude from pressing a key to releasing a key and its resonance) is set at the amplifier module M2. In addition, a slider for changing a gain at the amplifier module M2 is displayed between a top portion of the central circular region at the amplifier module M2 and a top portion of a circular portion surrounding the perimeter.

The filter module M3 is a module that adjusts tonal brightness, etc. by reducing or enhancing a frequency component of a musical sound to be generated, and a waveform representing a state of the musical sound set by the oscillator module M1 and the amplifier module M2 is displayed in the central circular region. In addition, as described later, when a filter is set at the filter module M3, display is performed which shields an upper portion or a lower portion or the upper portion and the lower portion of the central circular region according to the filter type. In addition, a slider for changing resonance is displayed between a top portion of the central circular region at the filter module M3 and a top portion of the circular portion surrounding the perimeter thereof.

The tool bar B stores icons which represent a plurality of envelopes or the setting contents of the modules corresponding to each of the modules.

In other words, a plurality of buttons (b1, b2, b3, b4, b5, and b6) which are associated with the respective modules are included in the tool bar B, and when tapping a button which is associated with any module, a group of icons representing the envelopes with a form that is prepared beforehand (setting parameter) or the setting contents of the modules (hereinafter, referred to as "a group of parameter icons") is displayed (P1 to P3 of FIG. 6 and E1 to E10 of FIGS. 4 and 8).

The switch SW has a switch function that switches ON/OFF of a musical sound generation system consisting of the oscillator module M1, the amplifier module M2, and the filter module M3. It should be noted that, although the information processing apparatus 1 can control a plurality of the musical sound generation systems, only a single musical sound generation system will be explained in the present embodiment for convenience of explanation.

Parameter Setting for Envelope

When a button in the tool bar B is tapped and a group of parameter icons representing an envelope is displayed, it is possible to set a parameter of the envelope by double-tapping any icon.

Figure 4:
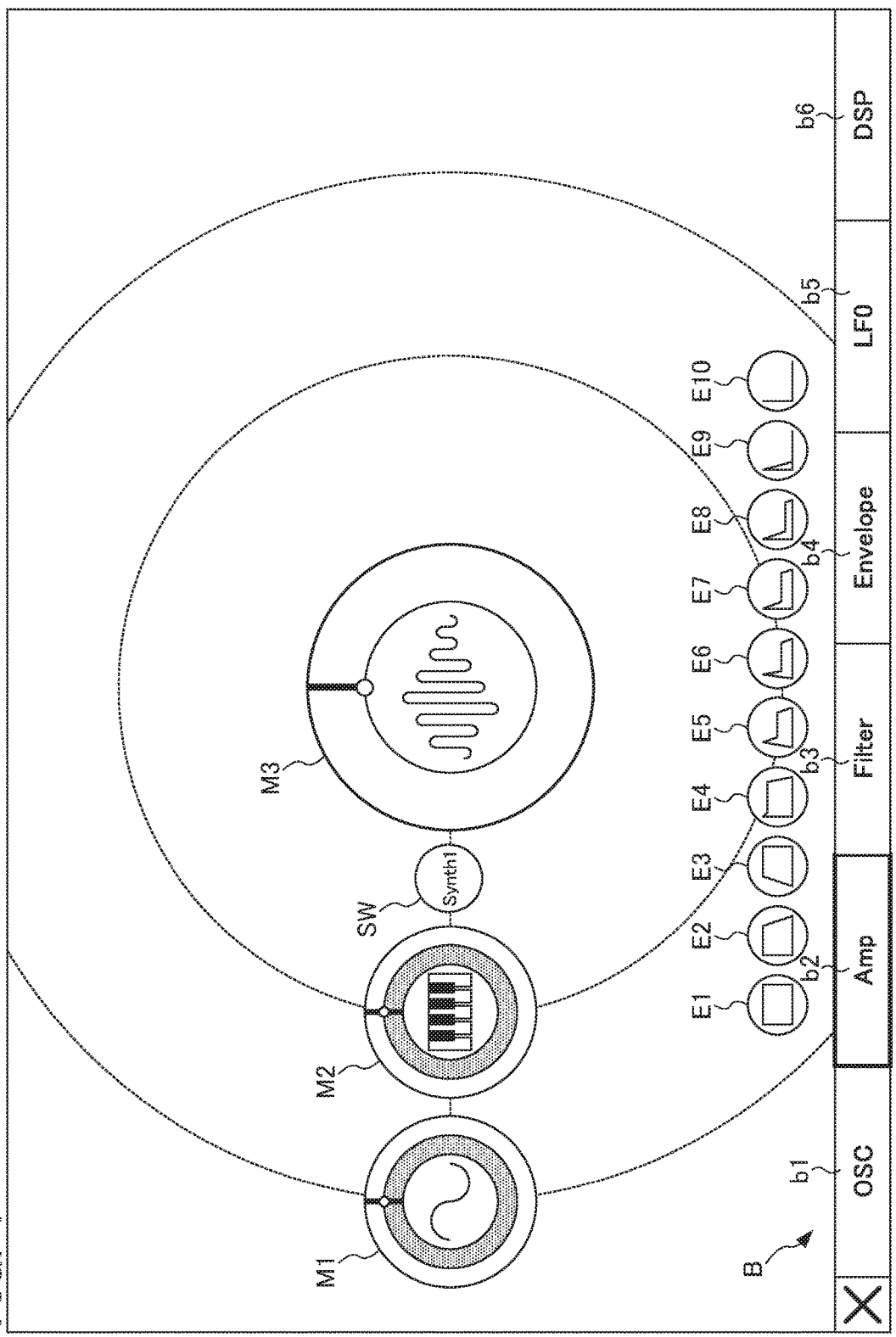
FIG. 4 is a schematic view illustrating a state in which a group of parameter icons representing envelopes is displayed.

FIG. 4 is a schematic view illustrating a state in which a group of parameter icons representing envelopes is displayed.

FIG. 4 illustrates a state in which an operation input is performed on a button (Amp) which is associated with the amplifier module M2 in the tool bar B, and a group of parameter icons (icons E1 to E10) is displayed in which figures of envelopes schematically representing changes of the magnitude of sounds is displayed. It should be noted that the icons E1 to E10 represent envelopes which respectively differ in the configuration of parameters set.

By way of double-tapping these icons E1 to E10, a state is entered in which an icon for parameter setting for the envelope is displayed and a change of a parameter by a user is received.

Figure 5:
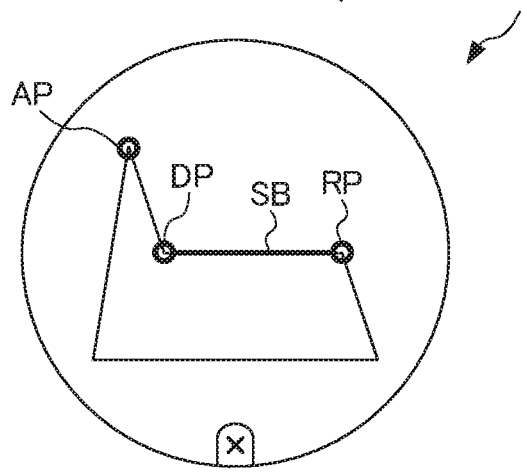
FIG. 5 is a schematic view illustrating a display example of an icon for parameter setting.

FIG. 5 is a schematic view illustrating a display example of an icon for parameter setting.

In the display example illustrated in FIG. 5, an icon PS for parameter setting of an envelope applied to the amplifier module M2 is displayed.

As illustrated in FIG. 5, in the icon PS for parameter setting, with a vertex at the lower left as an origin, the horizontal axis represents time and the vertical axis represents the magnitude of gain (intensity), and the icon PS includes each node corresponding to an attack point AP, a decay point DP, and a release point RP, and a link corresponding to a sustain bar SB.

Then, the period from the origin to the attack point AP represents an attack time AT (for example, a period from pressing a key up to the maximum sound volume), and the height of the attack point AP represents the magnitude of gain at the attack point AP (for example, the maximum sound volume when pressing a key). In addition, the period from the attack point AP to the decay point DP represents a decay time DT (a period from the maximum sound volume up to the time the sound volume converges), and the height of the decay point DP (in other words, the height of the sustain bar SB and the height of the release point RP) represents the sustain level. In addition, the period from the release point RP to the vertex of the lower right (the termination of the temporal axis) represents the release time RT (for example, the period from releasing a key to sound vanishing).

In the icon for parameter setting displayed in this way, it is possible to move each node of the attack point AP, the decay point DP, and the release point RP in the horizontal axis direction and the vertical axis direction, and the sustain bar SB changes accordingly. It is also possible to move the sustain bar SB in the vertical axis direction.

Then, by moving (changing) a node or a link corresponding to each parameter in the icon for parameter setting, a value of a parameter set for the envelope is changed by the parameter setting unit 53.

For this reason, it is possible for the user to easily set a parameter constituting an envelope applied to a module with an operation that is visually easy to understand.

In this way, in the information processing apparatus 1, it is possible to generate an envelope applied to a module more easily by means of a digital synthesizer.

Application of Setting Contents of Envelope/Module

When a button in the tool bar B is tapped and a group of parameter icons representing envelopes or the setting contents of a module, it becomes possible to apply the envelope or the setting contents to the module by dragging any icon to the module. At this time, an application degree of the envelope or the setting contents of the module changes according to the distance between icons in the group of parameter icons and icons of the modules. Therefore, it is possible to set the envelope or the setting contents which an icon in the parameter icons represents to a module with an easier operation, and it is also possible to notify a user of the degree to which the envelope or the setting contents are applied to the module in a visually easy to understand manner.

It should be noted that it is possible to fix the envelope or the setting contents of the module to an application degree by dragging an icon in the group of parameter icons and releasing at a position of the application degree for which a user intends.

With such a configuration, it is possible to easily perform the adjustment of the application degree when applying the envelope or the setting contents of the module to a module.

In this way, in the information processing apparatus 1, it is possible to enhance usability when creating musical sound with a digital synthesizer.

Figure 6:
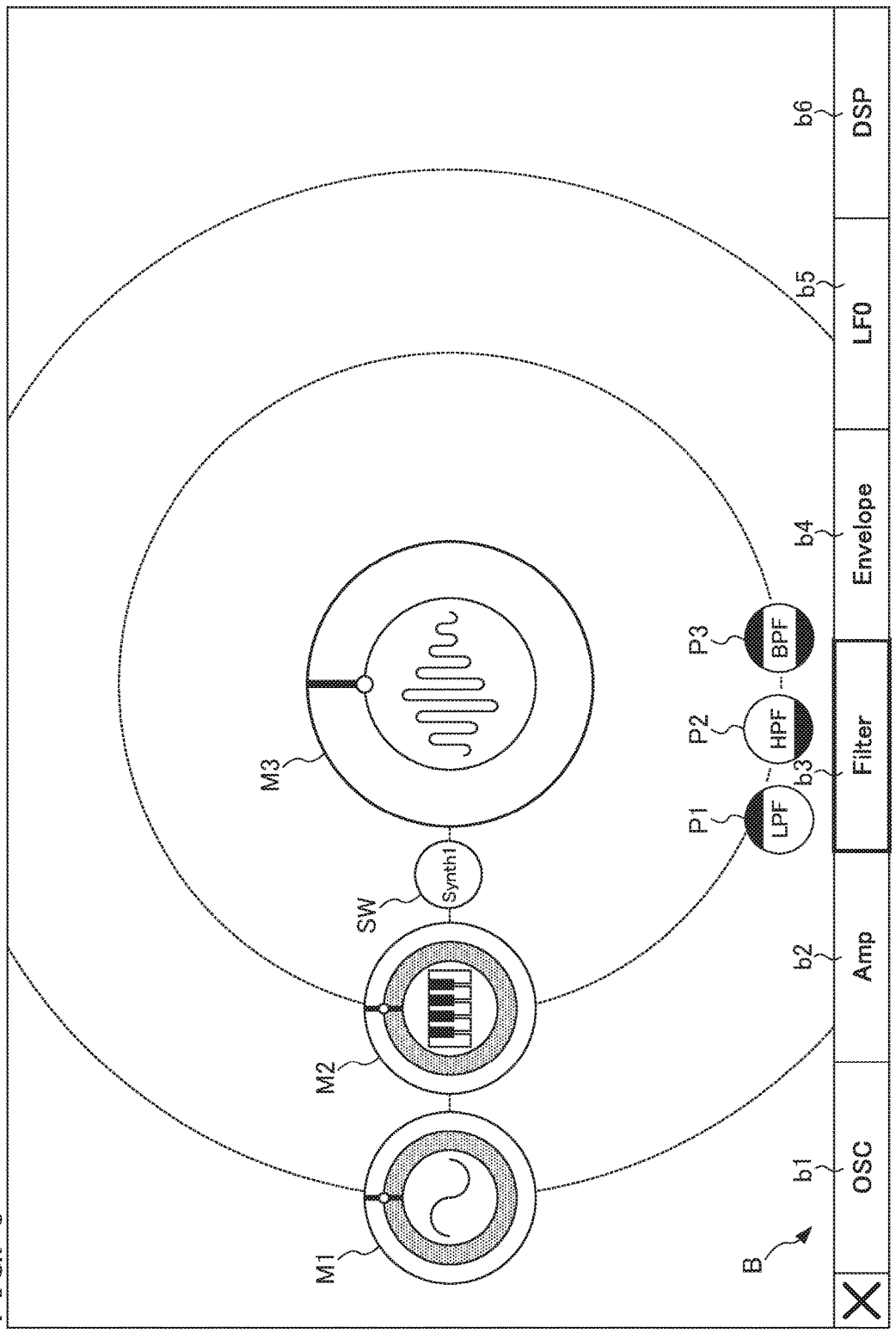
FIG. 6 is a schematic view illustrating a state in which a group of parameter icons representing setting contents of a module is displayed.

FIG. 6 is a schematic view illustrating a state in which a group of parameter icons representing setting contents of a module is displayed.

FIG. 6 illustrates a state in which an operation input is performed on a button (Filter) which is associated with the filter module M3 in the tool bar B, and a group of parameter icons (icons P1 to P3) is displayed in which figures representing filter types are schematically represented. It should be noted that the icons P1 to P3 represent a low pass filter (LPF), a high pass filter (HPF), and a band pass filter (BPF), respectively.

By way of dragging these icons P1 to P3, to the filter module M3, the filter is set to the filter module M3.

Figure 7:
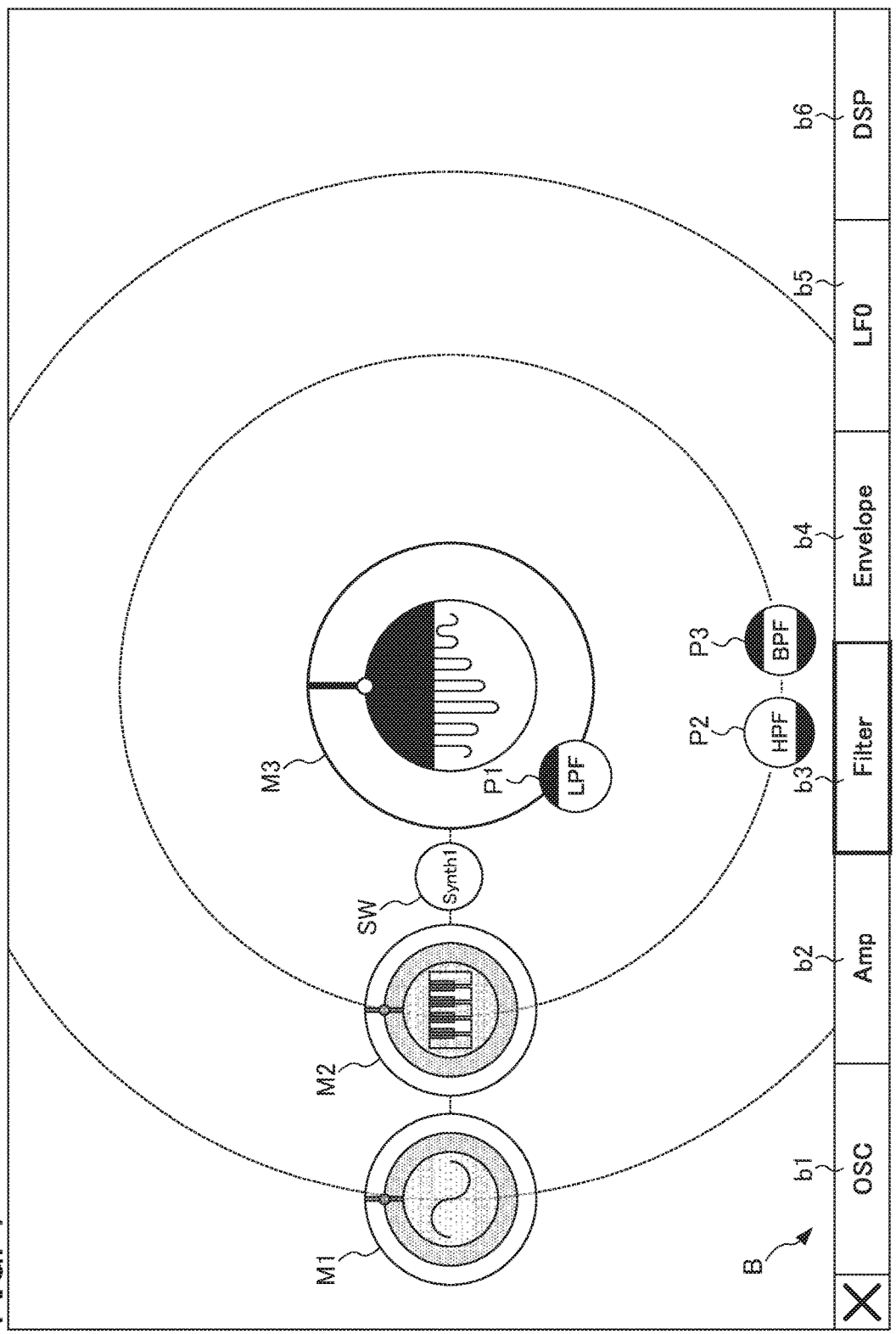
FIG. 7 is a schematic view illustrating a state in which an icon P1 representing a low pass filter is dragged to a filter module M3.

FIG. 7 is a schematic view illustrating a state in which an icon P1 representing a low pass filter is dragged to a filter module M3.

In FIG. 7, display is performed which shields an upper portion of a central circular region of the filter module M3. In other words, it is notified that a high frequency component is cut off by associating a vertical direction of the icon of the filter module M3 with the level of a frequency and shielding the upper portion (i.e. caused to pass in the low frequency region).

With such a configuration, it is possible to notify a user of the setting contents possessed by the icon P1 in a visually easy to understand manner.

It should be noted that, since the low pass filter cannot be applied to the oscillator module M1 or the amplifier module M2, in FIG. 7, the icons of these modules are greyed out, a result of which these icons are displayed to distinguish from the filter module M3 to which the low pass filter can be applied. For this reason, it is possible for the user to easily identify a module to which the icon P1 can be applied.

In addition, when the icon P1 is dragged to the filter module M3, the degree of shielding the upper portion in the central circular region changes according to the distance between the icon P1 and the filter module M3. For example, if the distance between the icon P1 and the filter module M3 is no less than 100 pixels, the application degree of the low pass filter to the filter module M3 becomes 0% (a state of the low pass filter not being applied), and thus, the upper portion of the central circular region is not shielded. In addition, if the distance between the icon P1 and the filter module M3 is no less than 50 pixels and less than 100 pixels, the application degree of the low pass filter to the filter module M3 is 50% (a state of a cut-off frequency being set to 50% of a setting value), and thus the upper portion in the central circular region becomes 50% of the maximum shielding degree. In addition, if the distance between the icon P1 and the filter module M3 is less than 50 pixels, the application degree of the low pass filter to the filter module M3 is 100% (a state of a cut-off frequency being set to 100% of a setting value), and thus the upper portion in the central circular region is shielded by the maximum shielding degree.

With such a configuration, it is possible to notify a user of the degree to which the setting contents of a module which the icon P1 represents are applied to the filter module M3 in a visually easy to understand manner. For example, in the case of the low pass filter or the high pass filter, it is possible to set a cut-off frequency according to the distance of the icon P1. For example, in the case of the low pass filter, as the distance of the icon P1 is closer to the filter module M3, it is possible to set the cut-off frequency in a lower frequency region. In addition, for example, in the case of the high pass filter, as the distance of the icon P1 is closer to the filter module M3, it is possible to set the cut-off frequency in a higher frequency region.

Figure 8:
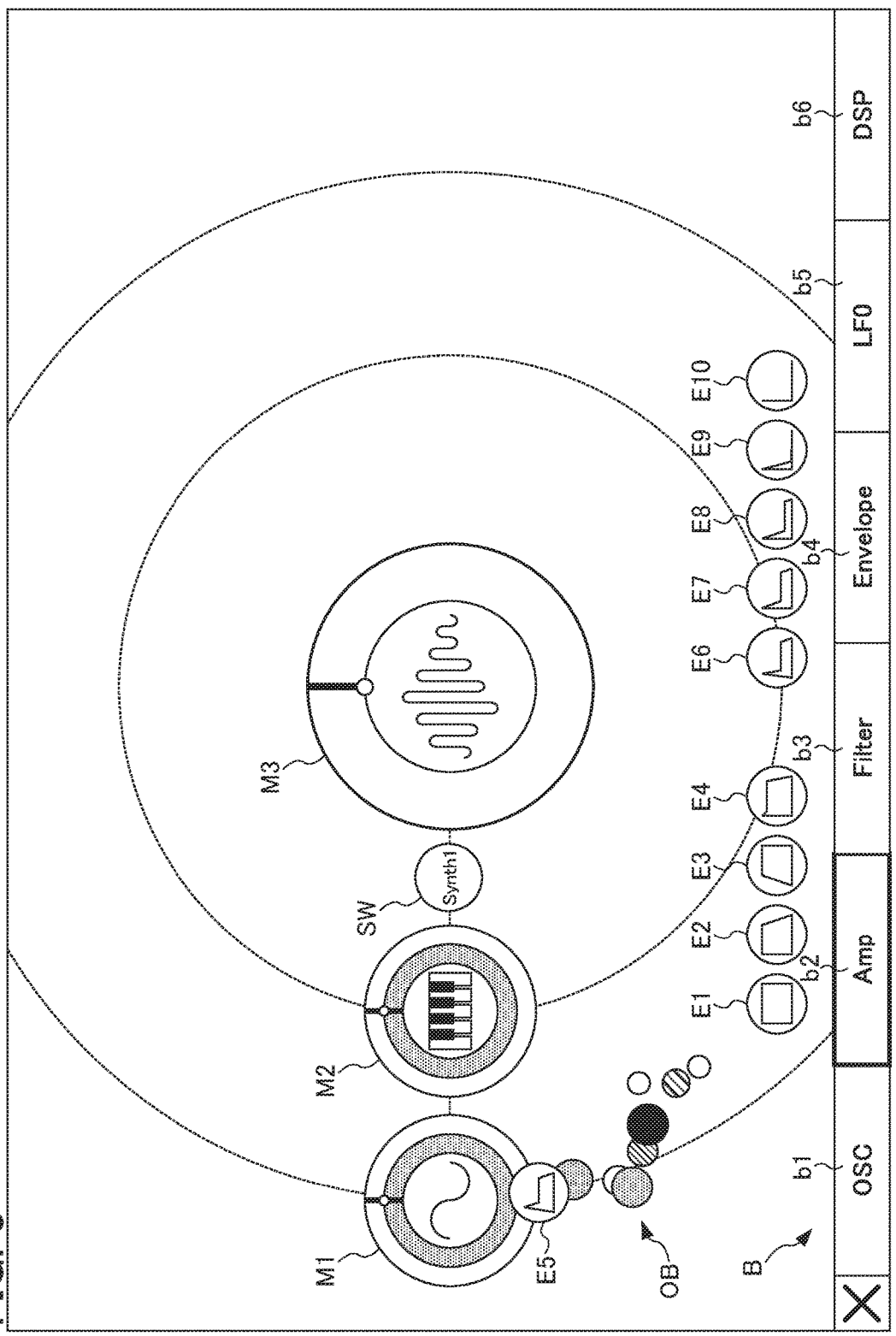
FIG. 8 is a schematic view illustrating a state in which an icon E5 representing an envelope was dragged to an oscillator module M1.

FIG. 8 is a schematic view illustrating a state in which an icon E5 representing an envelope was dragged to the oscillator module M1.

In FIG. 8, an image of an object OB in a form which is set beforehand (a plurality of circular objects which differ in size and color) is displayed along the trajectory of the icon E5 according to the degree to which the envelope of the icon E5 is applied to the oscillator module M1.

With such a configuration, it is possible to notify a user of the degree to which the envelope which the icon E5 represents is applied to the oscillator module M1 in a visually easy to understand manner. For example, it is possible to set the application degree of the depth of the envelope.

It should be noted that, in the present embodiment, in a case in which the envelope or the parameter icon which represents the setting contents of the module is caused to be close to the icon of the module, if the outer rim of the parameter icon is brought into contact with the outer rim of the icon of the module, the application of the envelope or the setting contents of the module to the module is accepted. Then, if these icons (more specifically, the centers of the icons) are closer than the case in which the outer rim of the parameter icon is brought into contact with the outer rim of the icon of the module, the application degree of the envelope or the setting contents of the module to the module changes.

With such a configuration, in the case of dragging the parameter icon, it is possible to notify a user of the timing at which the envelope or the setting contents of the module is applied to the module in a visually easy to understand manner.

Figure 9:
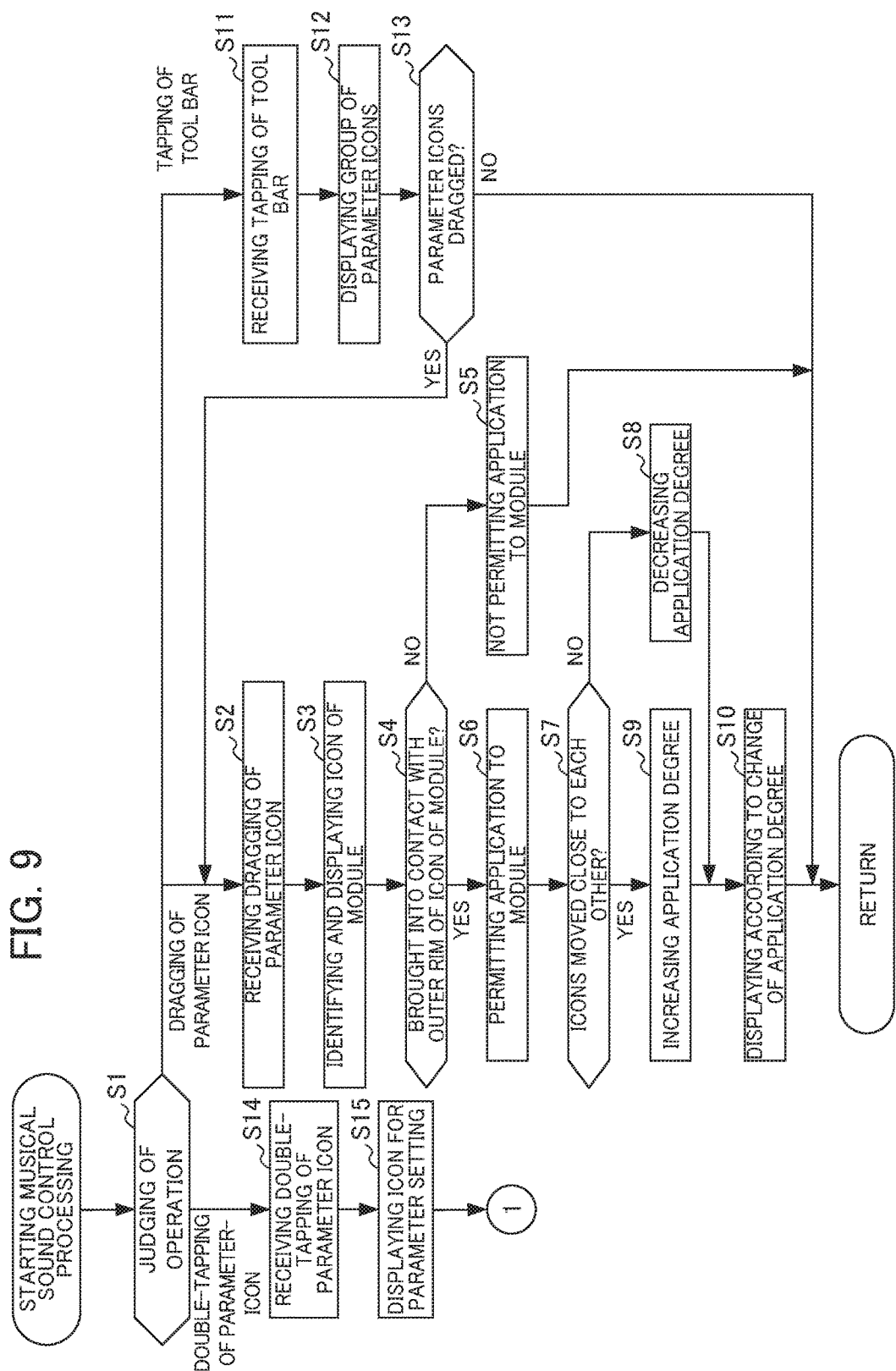
FIG. 9 is a flowchart illustrating a flow of the musical sound control processing executed by the electronic device of FIG. 1 having the functional configuration of FIG. 2.
Figure 10:
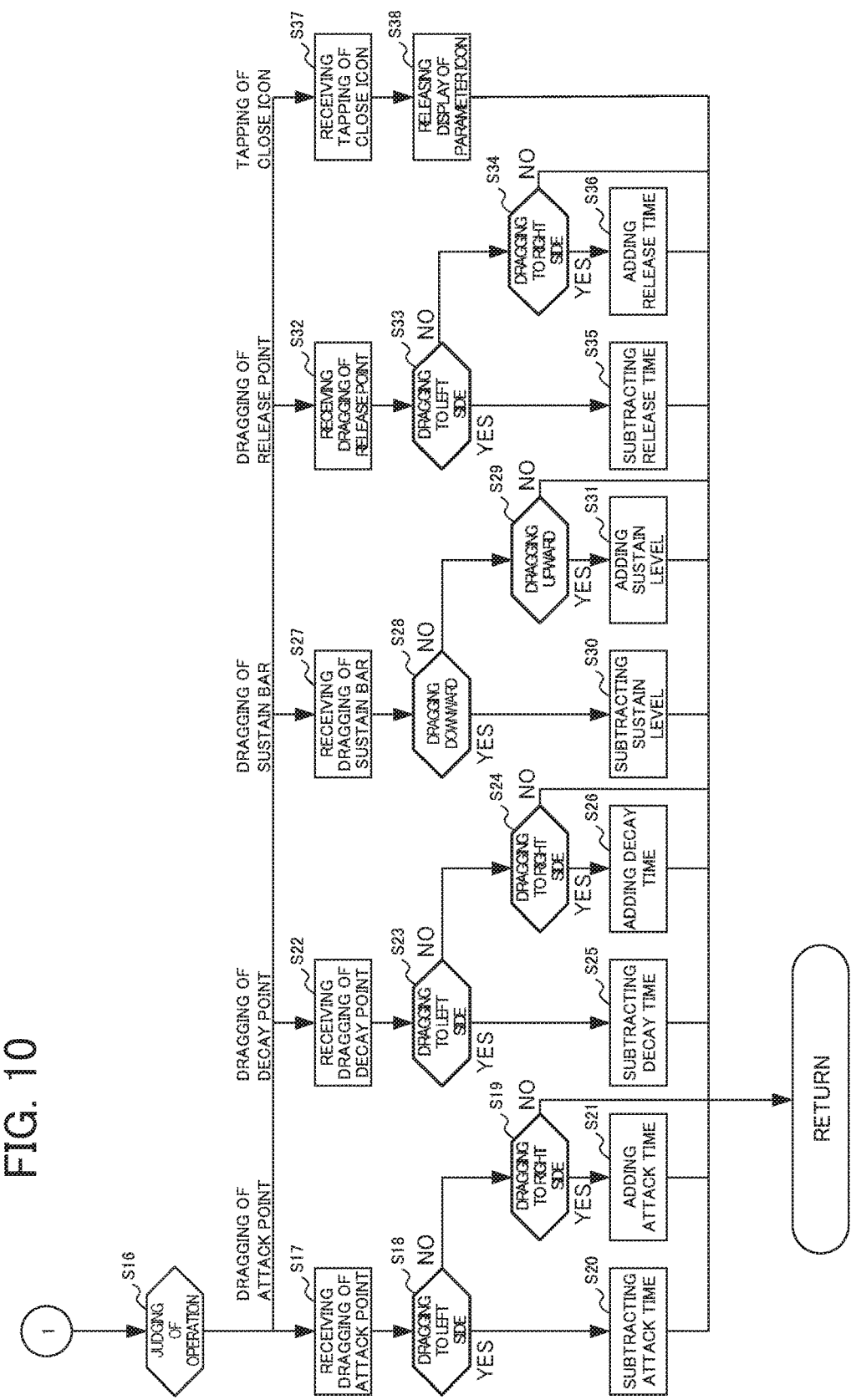
FIG. 10 is a flowchart illustrating a flow of the musical sound control processing executed by the electronic device of FIG. 1 having the functional configuration of FIG. 2.

FIG. 9 and FIG. 10 are flowcharts illustrating flows of the musical sound control processing executed by the information processing apparatus 1 of FIG. 1 having the functional configuration of FIG. 2.

The musical sound control processing starts by a user's operation of starting the musical sound control processing on the input unit 17.

In Step S1, the input receiving unit 52 judges an operation performed by the user.

In a case in which it is judged that the operation performed by the user is dragging a parameter icon, the processing advances to Step S2.

In addition, in a case in which it is judged that the operation performed by the user is tapping a tool bar, the processing advances to Step S11.

Moreover, in a case in which it is judged that the operation performed by the user is double-tapping the parameter icon, the processing advances to Step S14.

In Step S2, the input receiving unit 52 receives an operation input by dragging of the parameter icon.

In Step S3, the UI display control unit 51 identifies and displays an icon of a module to which the parameter icon thus dragged is applied. For example, an icon of a module to which the parameter icon thus dragged cannot be applied is greyed out.

In Step S4, the parameter setting unit 53 judges whether an outer rim of the parameter icon thus dragged was brought into contact with an outer rim of the module icon.

In a case in which the outer rim of the parameter icon thus dragged is not brought into contact with the outer rim of the module icon, it is judged as NO in Step S4 and the processing advances to Step S5.

On the other hand, in a case in which the outer rim of the parameter icon thus dragged is brought into contact with the outer rim of the module icon, it is judged as YES in Step S4 and the processing advances to Step S6.

In Step S5, the command generating unit 54 does not permit application to the module of an envelope or setting contents which the parameter icon represents. In other words, in a case in which the outer rim of the parameter icon thus dragged is not brought into contact with the outer rim of the module icon, the state of the module does not change.

After Step S5, the musical sound control processing repeats.

In Step S6, the command generating unit 54 permits application to the module of the envelope or the setting contents which the parameter icon represents.

In Step S7, the command generating unit 54 judges whether the parameter icon and the icon of the module are closer to each other.

In a case in which the parameter icon and the icon of the module are not closer to each other, it is judged as NO in Step S7 and the processing advances to Step S8.

On the other hand, in a case in which the parameter icon and the icon of the module are closer to each other, it is judged as YES in Step S7 and the processing advances to Step S9.

In Step S8, the command generating unit 54 increases the application degree to the module of the envelope or the setting contents which the parameter icon represent.

In Step S9, the command generating unit 54 decreases the application to the module degree of the envelope or the setting contents which the parameter icon represent.

It should be noted that, the distance between the parameter icon and the icon of the module does not change, the processing of Step S9 is skipped, and the application degree to the module of the envelope or the setting contents which the parameter icon represent is maintained.

After Step S8 and Step S9, the processing advances to Step S10.

In Step S10, the UI display control unit 51 changes display of the parameter icon or the icon of the module according to the change of the application degree to the module of the envelope or the setting contents which the parameter icon represent.

After Step S10, the musical sound control processing is repeated.

In Step S11, the input receiving unit 52 receives the operation of tapping the tool bar.

In Step S12, the UI display control unit 51 displays a group of parameter icons stored in the tool bar which was tapped.

In Step S13, the input receiving unit 52 judges whether the parameter icon was dragged.

In a case in which the parameter icon was not dragged, it is judged as NO in Step S13, and the musical sound control processing is repeated.

On the other hand, in a case in which the parameter was dragged, it is judged as YES in Step S13, and the processing advances to Step S2.

In Step S14, the input receiving unit 52 receives the operation of double-tapping the parameter icon.

In Step S15, the UI display control unit 51 displays an icon for parameter setting. With such a configuration, as illustrated in FIG. 5, it enters a state in which the icon for parameter setting can be operated (moving a node or a link).

In Step S16, the input receiving unit 52 judges the operation performed by the user.

In a case in which it is judged that the operation performed by the user is dragging an attack point, the processing advances to Step S17.

In a case in which it is judged that the operation performed by the user is dragging a decay point, the processing advances to Step S22.

In a case in which it is judged that the operation performed by the user is dragging a sustain bar, the processing advances to Step S27.

In a case in which it is judged that the operation performed by the user is dragging a release point, the processing advances to Step S32.

In a case in which it is judged that the operation performed by the user is tapping a close icon, the processing advances to Step S37.

In Step S17, the input receiving unit 52 receives the operation of dragging the attack point.

In Step S18, the input receiving unit 52 judges whether the attack point was dragged to the left side.

In a case in which the attack point was not dragged to the left side, it is judged as NO in Step S18, and the processing advances to Step S19.

On the other hand, in a case in which the attack point was dragged to the left side, it is judged as YES in Step S18, and the processing advances to Step S20.

In Step S19, the input receiving unit 52 judges whether the attack point was dragged to the right side.

In a case in which the attack point was dragged to the right side, it is judged as YES in Step S19, and the processing advances to Step S21.

On the other hand, in a case in which the attack point was not dragged to the right side, it is judged as NO in Step S19, and the musical sound control processing is repeated.

In Step S20, the parameter setting unit 53 subtracts the attack time.

In Step S21, the parameter setting unit 53 adds the attack time.

After Steps S20 and S21, the musical sound control processing is repeated.

In Step S22, the input receiving unit 52 receives the operation of dragging the decay point.

In Step S23, the input receiving unit 52 judges whether the decay point was dragged to the left side.

In a case in which the decay point was not dragged to the left side, it is judged as NO in Step S23, and the processing advances to Step S24.

On the other hand, in a case in which the decay point was dragged to the left side, it is judged as YES in Step S23, and the processing advances to Step S25.

In Step S24, the input receiving unit 52 judges whether the decay point was dragged to the right side.

In a case in which the decay point was dragged to the right side, it is judged as YES in Step S24, and the processing advances to Step S26.

In a case in which the decay point was not dragged to the right side, it is judged as NO in Step S24, and the musical sound control processing is repeated.

In Step S25, the parameter setting unit 53 subtracts the decay time.

In Step S26, the parameter setting unit 53 adds the decay time.

After Steps S25 and S26, the musical sound control processing is repeated.

In Step S27, the input receiving unit 52 receives the operation of dragging a sustain bar.

In Step S28, the input receiving unit 52 judges whether the sustain bar was dragged downward.

In a case in which the sustain bar was not dragged downward, it is judged as NO in Step S28, and the processing advances to Step S29.

On the other hand, in a case in which the sustain bar was dragged downward, it is judged as YES in Step S28, and the processing advances to Step S30.

In Step S29, the input receiving unit 52 judges whether the sustain bar was dragged upward.

In a case in which the sustain bar was dragged upward, it is judged as YES in Step S29, and the processing advances to Step S31.

On the other hand, in a case in which the sustain bar was not dragged upward, it is judged as NO in Step S29, and the musical sound control processing is repeated.

In Step S30, the parameter setting unit 53 subtracts the sustain level.

In Step S31, the parameter setting unit 53 adds the sustain level.

After Step S30 and Step S31, the musical sound control processing is repeated.

In Step S32, the input receiving unit 52 receives the operation of dragging the release point.

In Step S33, the input receiving unit 52 judges whether the release point was dragged to the left side.

In a case in which the release point was not dragged to the left side, it is judged as NO in Step S33, and the processing advances to Step S34.

On the other hand, in a case in which the release point was dragged to the left side, it is judged as YES in Step S33, and the processing advances to Step S35.

In Step S34, the UI display control unit 51 judges whether the release point was dragged to the right side.

In a case in which the release point was dragged to the right side, it is judged as YES in Step S34, and the processing advances to Step S36.

On the other hand, in a case in which the release point was not dragged to the right side, it is judged as NO in Step S34, and the musical sound control processing is repeated.

In Step S35, the parameter setting unit 53 subtracts the release time.

In Step S36, the parameter setting unit 53 adds the release time.

After Steps S35 and S36, the musical sound control processing is repeated.

In Step S37, the input receiving unit 52 receives the operation of tapping the close icon.

In Step S38, the UI display control unit 51 releases display of the icon for parameter setting.

After Step S38, the musical sound control processing is repeated.

With such processing, the icon for parameter setting is displayed by double-tapping the parameter icon, and it is possible to change the value of a parameter set for the envelope by moving (changing) each node of the attack point AP, the decay point DP, and the release point RP, and the sustain bar SB (link) at the icon for parameter setting.

Therefore, it is possible to easily set a parameter which constitutes an envelope applied to a module with a visually easy to understand operation.

In other words, it becomes possible to easily create an envelope applied to a module with a digital synthesizer.

In addition, a group of parameter icons representing an envelope or setting contents of a module is displayed by tapping a tool bar, and the envelope or the setting contents of the module are applied to the module according to the distance between the parameter icon and the icon of a module by dragging any parameter icon to the module.

With such a configuration, it is possible to easily adjust the application degree when applying to the module the envelope or the setting contents of the module.

In other words, it is possible to enhance usability when creating musical sound with a digital synthesizer.

The information processing apparatus 1 configured as above includes the UI display control unit 51, the input receiving unit 52, and the command generating unit 54.

The UI display control unit 51 displays a user interface screen including icons of modules constituting a digital synthesizer.

In addition, the UI display control unit 51 displays the parameter icon representing the envelope or the setting contents of the module applied to the module.

The input receiving unit 52 receives the operation of moving the parameter icon displayed by the UI display control unit 51 close to the icon of the module.

The command generating unit 54 changes the degree of applying the envelope or the setting contents of the module which represent the parameter icon, to the module, based on the distance between the parameter icon and the icon of the module.

With such a configuration, it is possible to easily adjust the application degree when applying to the module the envelope or the setting contents of the module.

In other words, it is possible to enhance usability when creating musical sound with a digital synthesizer.

In a case in which the outer rim of the parameter icon is brought into contact with the outer rim of the icon of the module, the command generating unit 54 executes the application of the envelope or the setting contents of the module which the parameter icon represent on the module.

With such a configuration, in the case of dragging the parameter icon, it is possible to notify a user of the timing at which the envelope or the setting contents of the module is applied to the module in a visually easy to understand manner.

In a case in which a plurality of icons of the modules are displayed on the user interface screen and an operation of moving the parameter icon close to the icon of the module is performed, the UI display control unit 51 identifies and displays the module to which the parameter icon can be applied and the module to which the parameter icon cannot be applied.

With such a configuration, the user can easily judge the module to which the icon P1 can be applied.

The UI display control unit 51 changes a display form of the icon of the module or the parameter icon according to the degree to which the envelope or the setting contents of the module which the parameter icon represent is applied to the module.

With such a configuration, it is possible to notify a user of the degree to which the envelope or the setting contents of the module which the parameter icon represents is applied to the module in a visually easy to understand manner.

In a case in which the operation of moving the parameter image representing a low pass filter, a high pass filter, or a band pass filter, as the setting contents of the module, close to the module representing a filter, the UI display control unit 51 performs display of shielding an upper portion or a lower portion, or the upper portion and the lower portion of the region in the module image by way of associating with a frequency region which is shielded by a filter which the parameter image represents.

With such a configuration, it is possible to notify a user of the degree to which the filter is applied to the module when setting various types of filters to a module representing a filter in a visually easy to understand manner.

When the operation of moving the parameter icon close to the icon of the module is performed, the UI display control unit 51 displays an image of an object in a form which is set beforehand along a trajectory of the parameter image according to the degree to which the envelope which the parameter icon represents is applied to the module.

With such a configuration, it is possible to notify a user of the degree to which the envelope representing the parameter icon is applied to the module in a visually easy to understand manner.

It should be noted that the present invention is not to be limited to the aforementioned embodiment, and that modifications, improvements, etc. within a scope that can achieve the object of the present invention are also included in the present invention.

For example, in a case in which the outer rim of the parameter icon is brought into contact with the outer rim of the icon of the module, although the application of the envelope or the setting contents of the module to the module is permitted in the abovementioned embodiment, the present invention is not limited thereto. In other words, it may be configured to change the application degree of the envelope or the setting contents of the module to the module according to the distance between the parameter icon dragged and the icon of the module, without performing control of permitting the application of the envelope or the setting contents of the module to the module upon the contact of the outer rims of the icons.

In addition, in the abovementioned embodiment, it may be configured to display characters representing a parameter which is set and setting contents of a module, in addition to the screen of the user interface generated by the UI display control unit 51 or the icons for parameter setting. For example, it is possible to display a type of a waveform set in the oscillator module, the magnitude of gain set in the amplifier module, a filter type set in the filter module, or the like by way of characters. In addition, the type of icons is not limited to the type of the icons of the abovementioned embodiments, and there may be another type of icons other than the type of the icons of the present embodiment. For example, the filter types are not limited to three types, and there may be no less than four types thereof.

In addition, in a case of moving the parameter icon close to the filter module, although the application degree of the filter to the filter module is set as a change in a cut-off frequency in the abovementioned embodiment, the present invention is not limited thereto. In other words, it may be configured so as to set the application degree of the filter according to the distance between the parameter icon and the filter module as a change in gain of the sound volume to be shielded, without changing the cut-off frequency.

In the above described embodiment, the information processing device 1 to which the present invention is applied is a smartphone; however, the present invention is not particularly limited thereto.

For example, the present invention can be applied to any electronic device in general with an information processing function. More specifically, for example, the present invention can be applied to a laptop personal computer, a printer, a television receiver, a video camera, a portable navigation device, a cell phone device, a digital camera, a portable gaming device, and the like.

The processing sequence described above can be executed by hardware, and can also be executed by software.

In other words, the functional configuration of FIG. 2 is merely an exemplification, and it is not particularly limited thereto. More specifically, it is sufficient so long as a function enabling the aforementioned series of processing to be executed as a whole to be equipped to the information processing device 1, and what types of functional blocks are used in order to realize this function are not particularly limited to the example of FIG. 2.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program not only can be constituted by the removable medium 31 shown in FIG. 1 which is distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), a Blu-ray (registered trademark) disk (Blu-ray Disk) or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present disclosure, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplifications, and are not to limit the technical scope of the present invention. Various other embodiments can be assumed for the present invention, and various modifications such as omissions and replacements are possible without departing from the spirit of the present invention. Such embodiments and modifications are included in the scope of the invention and the summary described in the present disclosure, and are included in the invention recited in the claims as well as the equivalent scope thereof.

What is claimed is:

1. An electronic device comprising:
a processor configured to:
control a display to display:
a module image corresponding to a module used for sound processing; and
a sound information image corresponding to sound information relating to generation of a sound which can be set in the module;
receive an operation to move at least one of the sound information image and the module image to change a positional relationship of the module image and the sound information image on the display;
judge whether the positional relationship that has been changed satisfies one of a plurality of predetermined conditions; and
in response to judging that the positional relationship that has been changed satisfies the one of the plurality of predetermined conditions, control the sound processing performed by setting the sound information according to the operation.

2. The electronic device according to claim 1,
wherein the one of the plurality of predetermined conditions is that at least one of the module image and the sound information image has been moved so that at least a partial region of the sound information image is brought into contact with at least a partial region of the module image;
wherein the processor is configured to, in response to judging that the positional relationship that has been changed satisfies the one of the plurality of predetermined conditions, control the sound processing performed by applying an effect of the sound information represented by the sound information image to the module.

3. The electronic device according to claim 1,
wherein the processor is configured to:
control the display to display a parameter setting image which represents a form of an envelope applied to the module;
receive an operation to the parameter setting image to change the form of the envelope; and
set a parameter of the module according to the form of the envelope that has been changed by the operation to the parameter setting image received.

4. The electronic device according to claim 3,
wherein the processor is configured to:
receive an operation to select the sound information image; and
in response to receiving the operation to select the sound information image, control the display to display the parameter setting image.

5. The electronic device according to claim 1,
wherein the one of the plurality of predetermined conditions is that at least one of the module image and the sound information image has been moved to change a distance between the sound information image and the module image, and
wherein the processor is configured to, in response to judging that the positional relationship that has been changed satisfies the one of the plurality of predetermined conditions, set a degree of applying an effect of the sound information corresponding to the sound information image to the module, based on a distance between the sound information image and the module image.

6. The electronic device according to claim 5,
wherein the processor is configured to:
increase the degree of applying the effect of the sound information corresponding to the sound information image to the module as the distance between the sound information image and the module image becomes smaller; and
decrease the degree of applying the effect of the sound information corresponding to the sound information image to the module as the distance between the sound information image and the module image becomes larger.

7. The electronic device according to claim 5,
wherein the processor is configured to change a display form of the module image or the sound information image according to the degree in which the effect of the sound information corresponding to the sound information image is applied to the module.

8. The electronic device according to claim 7,
wherein in a case where the module is a filter and where the sound information image corresponds to low pass filtering of the sound, the processor is configured to control the display to display the module image in which an upper portion of the module image is shielded,
wherein in a case where the module is a filter and where the sound information image corresponds to high pass filtering of the sound, the processor is configured to control the display to display the module image in which a lower portion of the module image is shielded, and
wherein in a case where the module is a filter and where the sound information image corresponds to band pass filtering of the sound, the processor is configured to control the display to display the module image in which the upper portion and the lower portion of the module image are shielded.

9. The electronic device according to claim 1,
wherein the one of the plurality of predetermined conditions is that at least one of the module image and the sound information image has been moved to shorten a distance between the sound information image and the module image, and
wherein the processor is configured to, in response to judging that the positional relationship that has been changed satisfies the one of the plurality of predetermined conditions, control the display to display an image of an object along a trajectory of the sound information image in a form according to a degree of applying an effect of the sound information corresponding to the sound information image to the module.

10. The electronic device according to claim 1,
wherein the processor is configured to:
control the display to display a plurality of module images;
receive an operation to move the sound information image on the display;
judge whether the operation to move the sound information image on the display is an operation to move the sound information image closer to one of the module images;
in response to judging that the operation to move the sound information image on the display is the operation to move the sound information image closer to the one of the module images, judge whether the one of the module images is the module image corresponding to the sound information image;
in response to judging that the one of the module images is the module image corresponding to the sound information image, control the display to display the one of the module images in a first display form; and
in response to judging that the one of the module images is not the module image corresponding to the sound information image, control the display to display the one of the module images in a second display form.

11. A control method executed by an electronic device having a display
wherein control method comprises:
controlling a display to display:
a module image corresponding to a module used for sound processing, wherein the module is at least one of an oscillator, an amplifier, or a filter; and
a sound information image corresponding to sound information relating to generation of a sound which can be set in the module;
receiving an operation to move at least one of the sound information image and the module image to change a positional relationship of the module image and the sound information image on the display;
judging whether the positional relationship that has been changed satisfies one of a plurality of predetermined conditions; and
in response to judging that the positional relationship that has been changed satisfies the one of the plurality of predetermined conditions, controlling the sound processing performed by setting the sound information according to the operation.

12. A non-transitory storage medium encoded with a computer-readable program that enables a computer to execute functions comprising:
controlling a display to display:
a module image corresponding to a module used for sound processing, wherein the module is at least one of an oscillator, an amplifier, or a filter; and
a sound information image corresponding to sound information relating to generation of a sound which can be set in the module;
receiving an operation to move at least one of the sound information image and the module image to change a positional relationship of the module image and the sound information image on the display;
judging whether the positional relationship that has been changed satisfies one of a plurality of predetermined conditions; and in response to judging that the positional relationship that has been changed satisfies the one of the plurality of predetermined conditions, controlling the sound processing performed by setting the sound information according to the operation.

\* \* \* \* \*

UNITED STATES PATENT AND TRADEMARK OFFICE
CERTIFICATE OF CORRECTION

PATENT NO. : 10,635,384 B2
APPLICATION NO. : 15/268913
DATED : April 28, 2020
INVENTOR(S) : Taiju Suzuki et al.

Page 1 of 1

It is certified that error appears in the above-identified patent and that said Letters Patent is hereby corrected as shown below:

In the Claims

Column 16, Claim 1, Line 21 should read:
sound processing, wherein the module is at least one of an oscillator, an amplifier, or a filter; and Column 16, Claim 2, Line 43 should read:
module image, Signed and Sealed this
Fifteenth Day of December, 2020

Andrei Iancu
*Director of the United States Patent and Trademark Office*